(12) United States Patent
Ahn et al.

(10) Patent No.: US 11,872,692 B2
(45) Date of Patent: Jan. 16, 2024

(54) CASE OPENING APPARATUS

(71) Applicants: SK On Co., Ltd., Seoul (KR); Hana Technology Co., Ltd., Gyeonggi-do (KR)

(72) Inventors: Ji Eun Ahn, Daejeon (KR); Sang Jun Park, Daejeon (KR); Young Rae Oh, Daejeon (KR); Kang San Kim, Daejeon (KR); Jae Min Ryu, Daejeon (KR); Ho Jeong Lee, Gyeonggi-do (KR); Jeong Seok Jeong, Gyeonggi-do (KR)

(73) Assignees: SK ON CO., LTD., Seoul (KR); HANA TECHNOLOGY CO., LTD., Gyeonggi-do (KR)

( * ) Notice: Subject to any disclaimer, the term of this patent is extended or adjusted under 35 U.S.C. 154(b) by 0 days.

(21) Appl. No.: 18/296,140

(22) Filed: Apr. 5, 2023

(65) Prior Publication Data

US 2023/0321845 A1 Oct. 12, 2023

(30) Foreign Application Priority Data

Apr. 6, 2022 (KR) ........................ 10-2022-0042753

(51) Int. Cl.
*B25J 15/06* (2006.01)
*H01M 10/04* (2006.01)

(52) U.S. Cl.
CPC ..... *B25J 15/0616* (2013.01); *H01M 10/0404* (2013.01)

(58) Field of Classification Search
CPC .................. B25J 15/0616; H01M 10/0404
See application file for complete search history.

(56) References Cited

U.S. PATENT DOCUMENTS

| 5,988,718 | A  | * | 11/1999 | Sugimoto | ............ B66C 1/0256 414/737 |
| 10,005,191 | B2 | * | 6/2018  | Takikawa | ................. B25J 15/12 |
| 10,124,486 | B2 | * | 11/2018 | Marttinen | ............... F16D 7/027 |
| 2006/0035141 | A1 |   | 2/2006  | Lee | |
| 2007/0241573 | A1 | * | 10/2007 | Teng | ......................... B25J 1/04 294/198 |
| 2015/0028613 | A1 | * | 1/2015  | Nakayama | ........... B25J 15/0206 294/196 |

FOREIGN PATENT DOCUMENTS

| KR | 10-2005-0121510 | | 12/2005 |
| KR | 100876455 B1 | * | 12/2008 |

OTHER PUBLICATIONS

Amazon.com, Showpin Smart Phones Suction Cup Tool Opening Pliers Repair LCD Screen, 3 in 1 iPhone Repair Tool Prying Tool Compatible with Cell Phone/Laptop/Tablet PC, Sep. 23, 2015. https://www.amazon.com/Phones-Opening-Suction-Showpin-Compatible/dp/B015PBX3AM?th=1.*

* cited by examiner

*Primary Examiner* — Stephen A Vu
(74) *Attorney, Agent, or Firm* — IP & T GROUP LLP

(57) ABSTRACT

A case opening apparatus is disclosed.
In some implementations, the case opening apparatus may include a suction portion including a first suction portion configured to suction an upper portion of a case of a battery cell being in a folded state and a second suction portion configured to suction a lower portion of the case, and a rotation driving portion configured to open the inside of the case by rotating the first suction portion.

8 Claims, 9 Drawing Sheets

CASE OPENING APPARATUS

CROSS-REFERENCE TO RELATED APPLICATION(S)

This patent document claims the priority and benefits of Korean Patent Application No. 10-2022-0042753 filed on Apr. 6, 2022, the disclosure of which is incorporated herein by reference in its entirety.

TECHNICAL FIELD

The technology and implementations disclosed in this patent document generally relate to an apparatus for easily opening a case of a battery cell in a process of manufacturing the battery cell.

BACKGROUND

With the recent development of electric vehicles, batteries for energy storage, robots, satellites, and the like, battery cells, high-performance batteries being repeatedly chargeable and dischargeable, have been actively researched. Currently, commercialized battery cells include nickel-cadmium batteries, nickel-hydrogen batteries, nickel-zinc batteries, lithium secondary batteries, and the like. Among such batteries, lithium secondary batteries have been drawing attention for being freely charged and discharged, having an extremely low self-discharge rate, and high energy density due to having almost no memory effect as compared to nickel-based secondary batteries.

In general, battery cells are manufactured by forming an accommodation space in a case, disposing an electrode assembly in the accommodation space, and sealing the accommodation space. In order to increase the yield and improve the reliability of a product, there is a need for an apparatus capable of easily disposing the electrode assembly in the accommodation space of the case.

RELATED ART DOCUMENT

Patent Document

Patent Document: KR Patent Application Publication No. 10-2005-0121510

SUMMARY

The disclosed technology can be implemented in some embodiments to provide an apparatus capable of easily opening a case of a battery cell in a process of manufacturing the battery cell.

In some embodiments of the disclosed technology, an inductor includes a suction portion including a first suction portion configured to suction an upper portion of a case of a battery cell being in a folded state and a second suction portion configured to suction a lower portion of the case, and a rotation driving portion configured to open the inside of the case by rotating the first suction portion.

The first suction portion and the second suction portion may be configured to linearly move in a first direction, and to suction the upper portion and the lower portion of the case, respectively.

The case opening apparatus may further include a rotary plate member having one surface to which the first suction portion is fastened, the rotary plate member rotated by the rotation driving portion, and a base frame to which the second suction portion and the rotary plate member are coupled.

The base frame may be disposed to linearly move in a second direction, orthogonal to the first direction.

The rotary plate member may rotate in a state in which a folded line of the case corresponds to a rotational axis of the rotary plate member.

The case opening apparatus may further include a position display portion configured to display the rotational axis of the rotary plate member.

The case opening apparatus may further include at least one detection unit disposed on the base frame, and a detection protrusion formed to protrude outwardly from the rotary plate member, the detection protrusion detected by the detection unit in a maximum rotation position of the rotary plate member.

The case opening apparatus may further include a first lifting driving apparatus configured to move the first suction portion in a first direction. The first lifting driving apparatus may be fixedly coupled to the rotary plate member.

The case opening apparatus may further include a second lifting driving apparatus configured to move the second suction portion in the first direction. The second lifting driving apparatus may be fixedly coupled to the base frame.

The suction portion may be disposed on each of opposite sides of the case to simultaneously suction opposite edges of the case.

The case opening apparatus according to the present embodiment may simultaneously suction a first case and a second case overlapping each other, obtained by folding a case, and may then open the case, thereby preventing the case from shaking or a position of the case from being changed in the process of opening the case.

BRIEF DESCRIPTION OF DRAWINGS

Certain aspects, features, and advantages of the disclosed technology are illustrated by the following detailed description with reference to the accompanying drawings.

DETAILED DESCRIPTION

Figure 1:
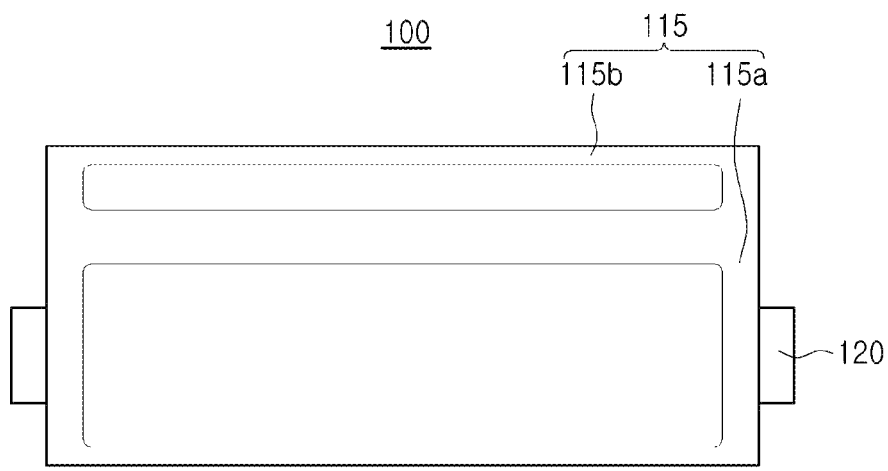
FIG. 1 is a plan view of a battery cell according to an embodiment of the disclosed technology.

Features of the disclosed technology disclosed in this patent document are described by example embodiments with reference to the accompanying drawings.

Before describing embodiments of the disclosed technology, the words and terminologies used in the specification and claims should not be construed with common or dictionary meanings, but construed as meanings and conception coinciding the spirit of the disclosed technology under a principle that the inventor(s) can appropriately define the conception of the terminologies to explain the disclosed technology in the optimum method. Therefore, embodiments described in the specification and the configurations illustrated in the drawings are not more than the most preferred embodiments of the disclosed technology and do not fully cover the spirit of the disclosed technology.

Accordingly, it should be understood that there may be various equivalents and modifications that can replace those provided when the present application is filed.

Hereinafter, preferred embodiments of the disclosed technology will be described in detail with reference to the accompanying drawings. In this case, it should be noted that the same components are denoted by the same reference numerals in the accompanying drawings. In addition, detailed descriptions of well-known functions and configurations that may obscure the gist of the disclosed technology will be omitted. In addition, some components are exaggerated, omitted, or schematically illustrated in the accompanying drawings, and the size of each component does not fully reflect the actual size.

In addition, in embodiments of the disclosed technology, an upper side, an upper portion, a lower side, a lower portion, a side surface, and the like are described with reference to the drawings, and may be described differently when a direction of a corresponding object is changed.

The disclosed technology can be implemented in some embodiments to provide a case opening apparatus.

Figure 2:
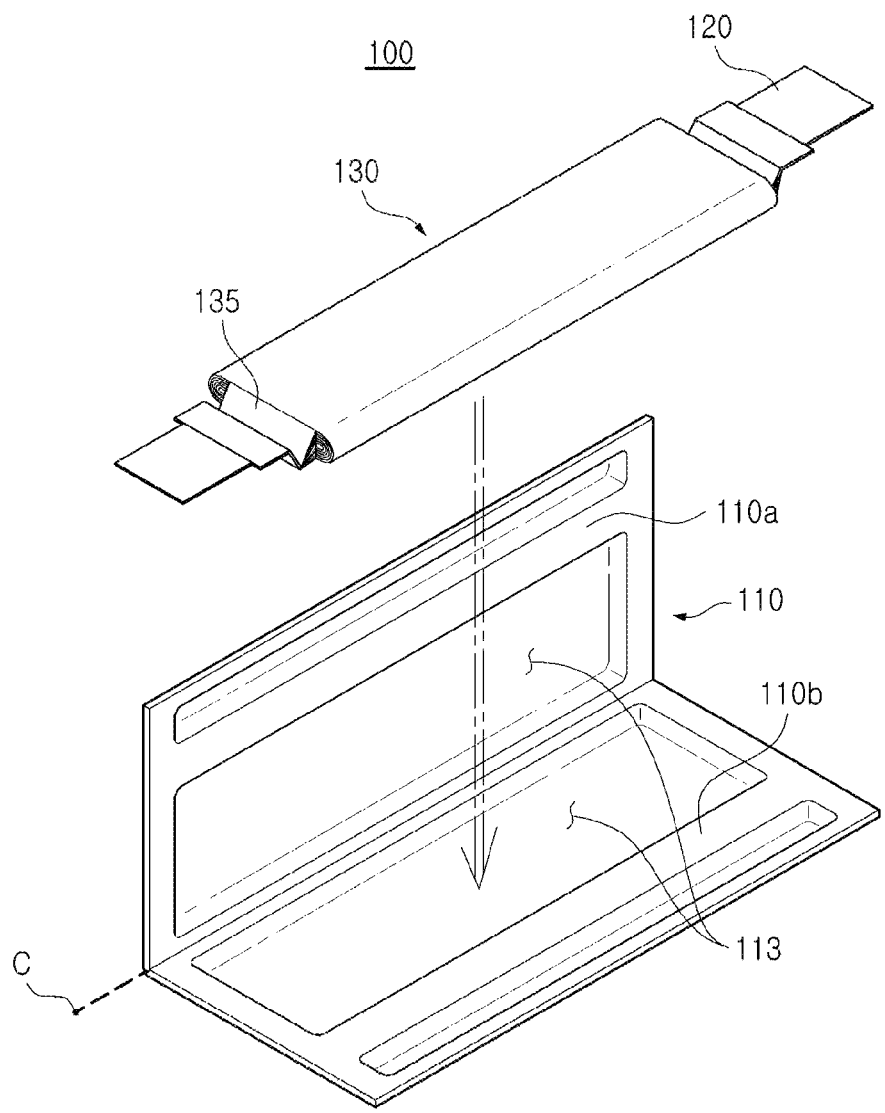
FIG. 2 is an exploded perspective view of the battery cell illustrated in FIG. 1.

FIG. 1 is a plan view of a battery cell according to an embodiment of the disclosed technology. FIG. 2 is an exploded perspective view of the battery cell illustrated in FIG. 1.

Referring to FIGS. 1 and 2, a battery cell 100 manufactured through a case opening apparatus according to the present embodiment may include an electrode assembly 130 and a case 110 accommodating the electrode assembly 130.

The battery cell 100 according to the present embodiment, a battery capable of being charged and discharged, may include a lithium ion (Li-ion) battery or a nickel metal hydride (Ni-MH) battery. The nickel metal hydride battery may be a battery cell using nickel for a positive electrode, using a hydrogen-absorbing alloy for a negative electrode, and using an alkaline aqueous solution as an electrolyte, and may have high capacitance per unit volume, such that the nickel metal hydride battery may be used within various fields, such as not only being used as an energy source for an electric vehicle (EV), a hybrid vehicle (HEV), or the like, but also being used for energy storage.

The electrode assembly 130, a member in which a plurality of electrodes are stacked, may be formed to have a substantially hexahedral shape, and may be accommodated in an accommodation space 113 of the case 110 together with an electrolyte.

The case 110 may be formed of a flexible film material. For example, the case may be formed of a material obtained by insulating a surface of a metal thin film formed of aluminum.

The accommodation space 113 in which the electrode assembly 130 is accommodated may be provided in the case 110. In addition, the electrode lead 120 may be disposed to protrude from the outside of the case 110.

As illustrated in FIG. 2, the battery cell 100 according to the present embodiment may seal the accommodation space 113 by folding a sheet of exterior material and then bonding three side surfaces thereof. Accordingly, the case 110 according to the present embodiment may be divided into a first case 110a and a second case 110b with respect to a bending line C along which the exterior material is folded.

Specifically, the battery cell 100 according to the present embodiment may be manufactured by accommodating the electrode assembly 130 in the accommodation space 113, folding the exterior material along the bending line C, and then bonding, to each other, edges at which the first case 110a and the second case 110b are in contact with each other to seal the accommodation space 113.

As a method of bonding the edges to each other, a thermal fusion method may be used, but the disclosed technology is not limited thereto. Hereinafter, a bonded edge portion is referred to as a sealing portion 115.

In the present embodiment, the sealing portion 115 may be divided into a first sealing portion 115a formed in a portion in which the electrode lead 120 is disposed, and a second sealing portion 115b formed in a portion in which the electrode lead 120 is not disposed.

In the battery cell 100 according to the present embodiment, the first case 110a and the second case 110b may each have the accommodation space 113. However, the disclosed technology is not limited thereto, and various modifications may be made, such as the accommodation space 113 provided in only one of the first case 110a and the second case 110b, and the like.

In addition, an electrode tab 135 may be disposed between the electrode assembly 130 and the sealing portion 115. The electrode tab 135 may electrically connect the electrode assembly 130 and the electrode lead 120 to each other, and a plurality of electrode tabs 135 may extend from the electrode assembly 130 to be bonded to at least one electrode lead 120.

The electrode lead 120 may include a positive electrode lead and a negative electrode lead. At least a portion of the electrode lead 120 may protrude to the exterior of the case 110, and the electrode assembly 130 may be electrically connected to external elements through the electrode lead 120.

The battery cell 100 configured as described above may be manufactured by form an accommodation space 113 in the case 110 through press processing, and the like, accommodating the electrode assembly 130 in the accommodation space 113, and then sealing the accommodation space 113.

A case opening apparatus 1 according to the present embodiment described below may be used to open the accommodation space 113 of the case 110 in order to dispose the electrode assembly 130 in the accommodation space 113 of the case 110. Details of the case opening apparatus 1 will be described below.

Figure 3:
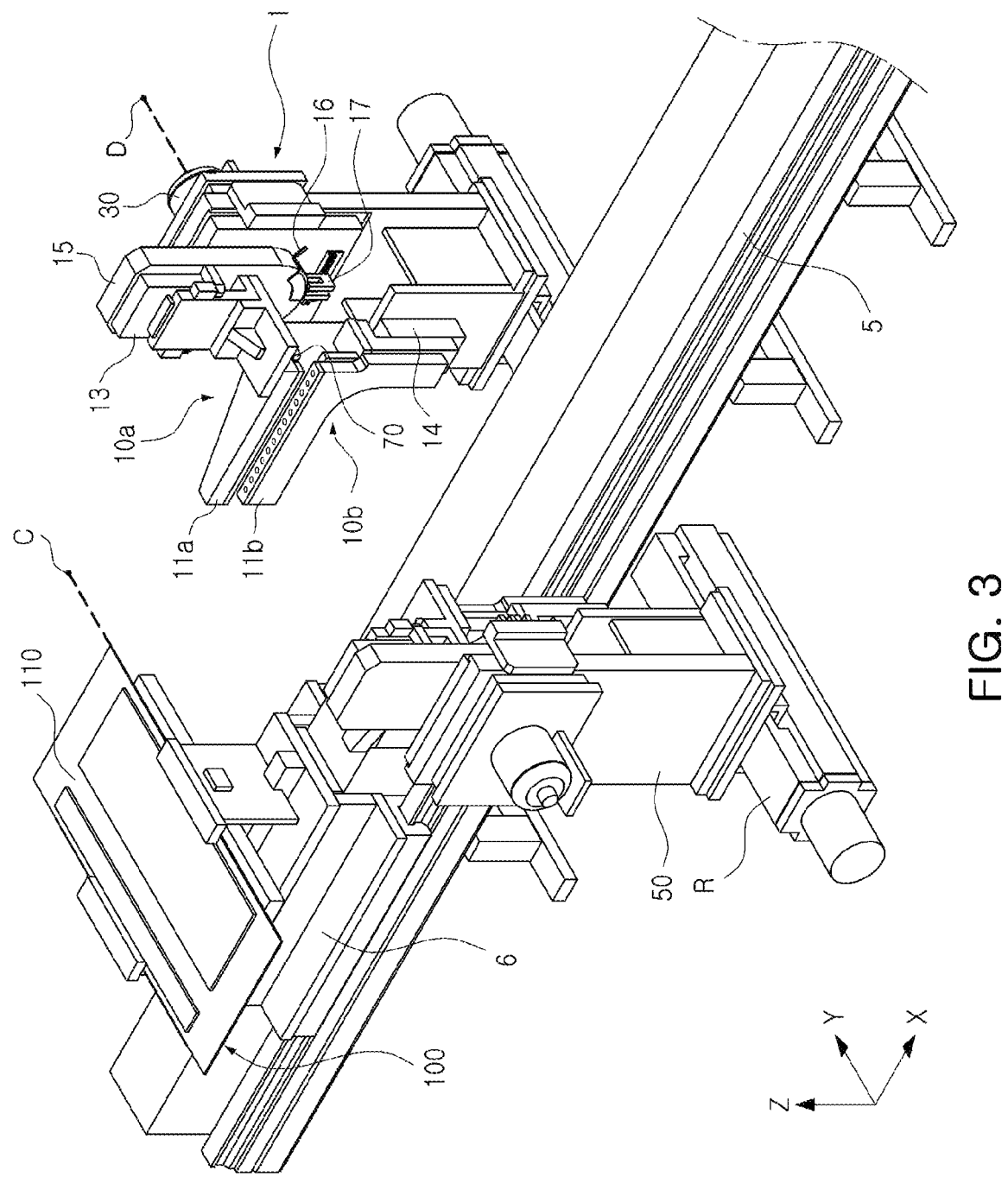
FIGS. 3 to 5 are schematic perspective views of a case opening apparatus according to an embodiment of the disclosed technology.
Figure 4:
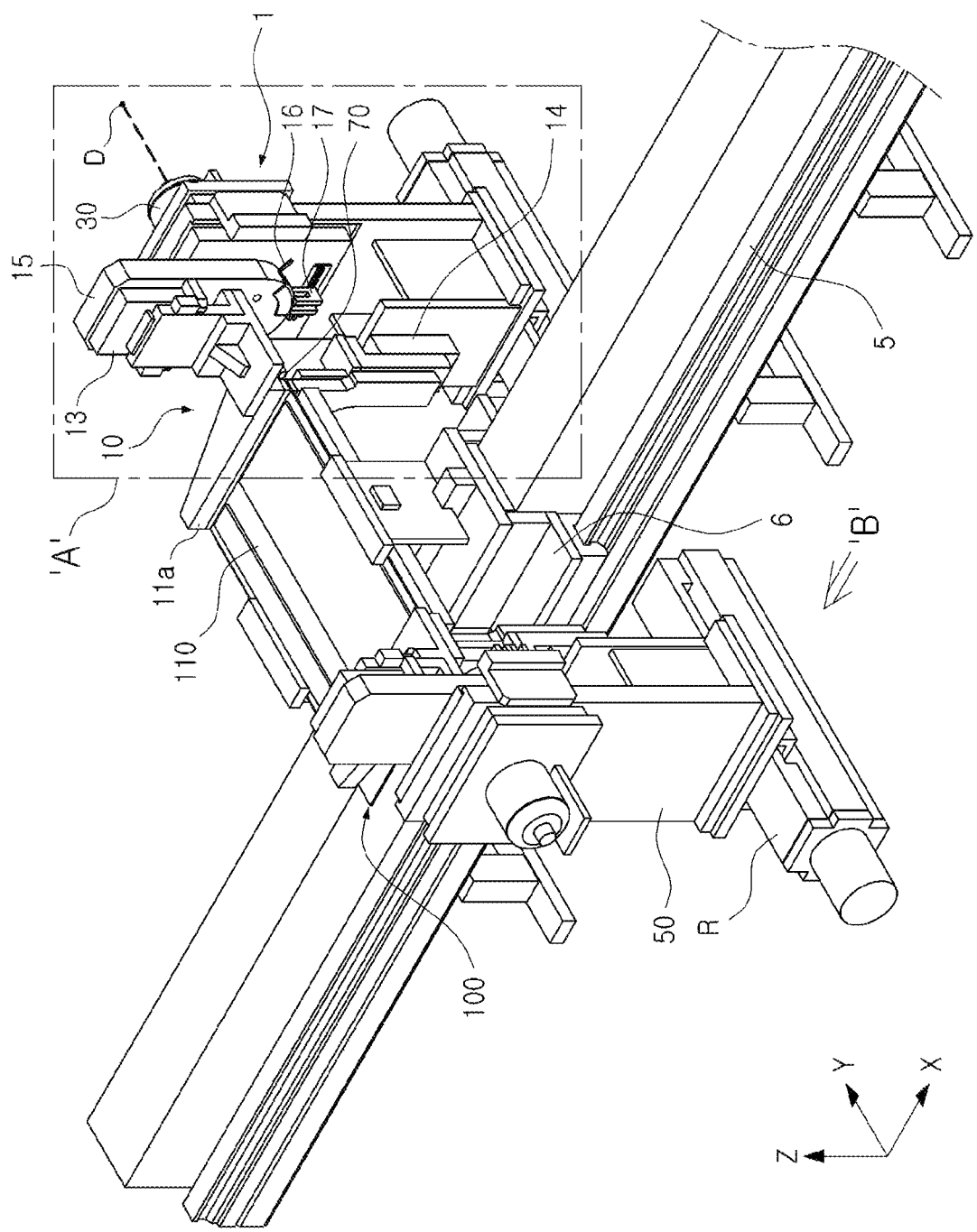
Figure 5:
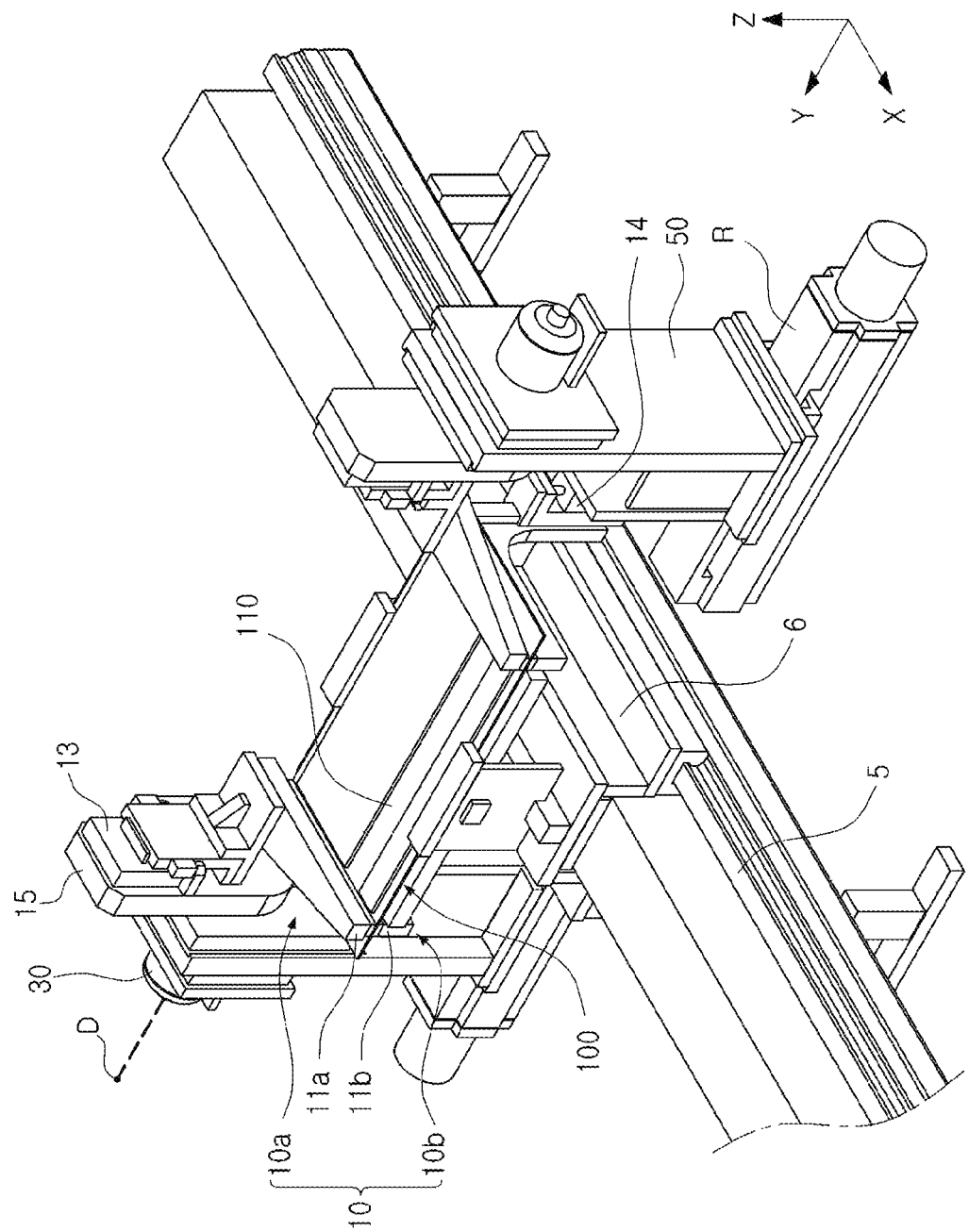
Figure 6:
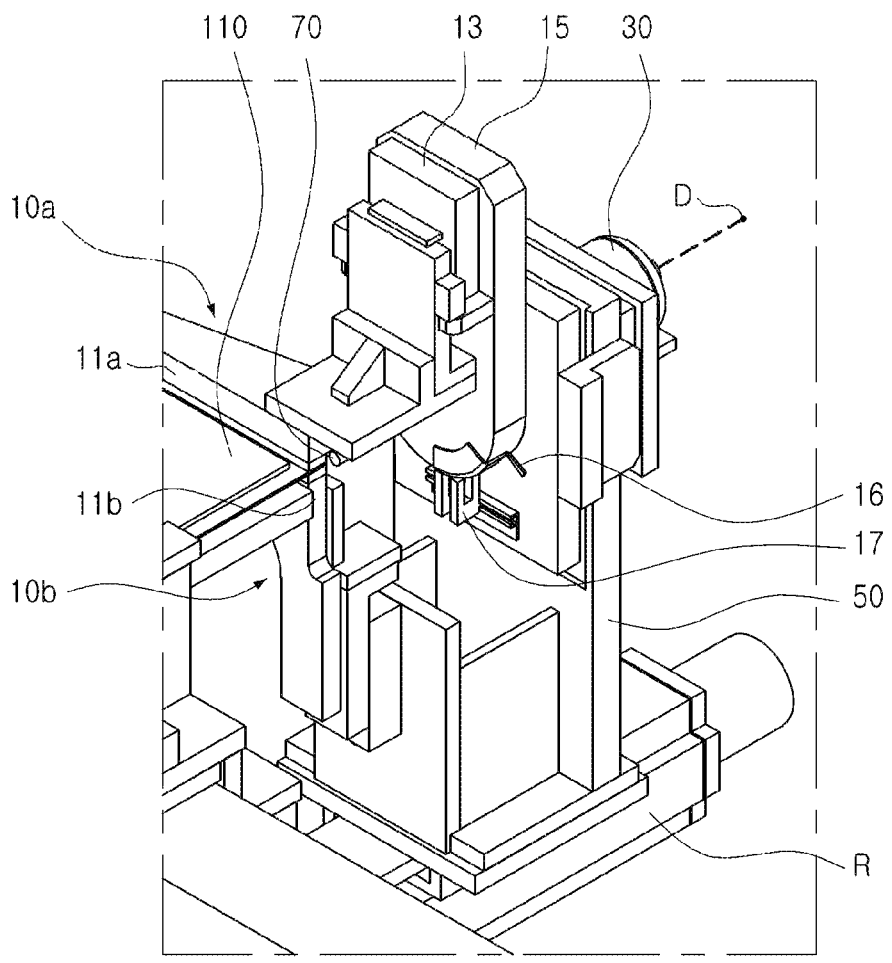
FIG. 6 is an enlarged view of portion "A" of FIG. 4.

FIGS. 3 to 5 are schematic perspective views of a case opening apparatus according to an embodiment of the disclosed technology. FIG. 6 is an enlarged view of portion "A" of FIG. 4. Here, FIG. 3 illustrates a process in which the case is transferred to the case opening apparatus, and FIG. 4 illustrates a state in which the transfer is completed. In addition, FIG. 6 is a view of FIG. 5 in another direction.

Hereinafter, an input direction of the case 110 or a longitudinal direction (X-direction) of a transfer rail 5 may be referred to as a "third direction," a horizontal direction (Y-direction), orthogonal to the third direction, may be referred to as a "second direction," and a vertical direction (Z-direction), orthogonal to the third direction and the second direction, may be referred to as a "first direction."

Referring to FIGS. 3 to 6, the case opening apparatus 1 according to an embodiment of the disclosed technology may suction the case 110 being transferred while being mounted on the transfer carrier 6 in a folded state, and may then open an accommodation space of the case 110, thereby preventing the case 110 from shaking or being displaced in a process of manufacturing a battery cell.

To this end, the case opening apparatus 1 may include a base frame 50, a rotation driving portion 30, a suction portion 10, a position display portion 70, and a rotation detection unit.

In the present embodiment, the battery cell case 110 may be transferred while being seated on the transfer carrier 6 moving along the transfer rail 5. In addition, the case opening apparatus 1 may be disposed on each of opposite sides of the transfer rail 5 to open an accommodation space of the case 110 seated on the transfer carrier 6. Accordingly, the case opening apparatus 1 may be disposed on each of the opposite sides of the case 110 to simultaneously suction opposite edges of the case 110.

The case opening apparatuses 1, respectively disposed on the opposite sides of the transfer rail 5, may be configured to be symmetrical to each other, and thus may be configured to be identical to each other or very similar to each other. Accordingly, hereinafter, for ease of description, a description will be provided based on one of the case opening apparatuses 1, disposed on the opposite sides of the transfer rail 5.

The base frame 50 may form a body of the case opening apparatus 1, and may be configured to be movable in the second direction (Y-direction). To this end, a rail portion R may be disposed below the base frame 50 in the second direction, and the base frame 50 may be attached to the rail portion R so as to be reciprocally movable along the rail portion R. For example, the base frame 50 according to the present embodiment may linearly move in a direction farther away from or closer to the transport carrier 6 along the rail portion R.

The suction portion 10 may be coupled to the base frame 50.

The suction portion 10 may suction a side portion of the case 110 supplied to the case opening apparatus 1 by the transfer carrier 6.

To this end, the suction portion 10 may include a first suction portion 10a and a second suction portion 10b. Here, the "side portion" of the case 110 may refer to a portion disposed to be adjacent to the case opening apparatus 1, among edge portions forming a sealing portion (115 in FIG. 1) of the case 110. In addition, suctioning the side portion may be understood as suctioning a portion of the case 110 corresponding to the sealing portion 115.

In the following description, a portion of the case 110, suctioned by the first suction portion 10a, may be referred to as a "first suction surface," and a portion of the case 110, suctioned by the second suction portion 10b, may be referred to as a "second suction surface." Accordingly, in the present embodiment, the first and second suction surfaces may refer to portions formed as the first sealing portion 115a, among portions of the case 110 formed as the sealing portion 115. In addition, an upper portion of the case 110 being in a folded state may be referred to as a first case 110a, and a lower portion of the case 110 may be referred to as a second case 110b.

The first suction portion 10a may rotate in a state of suctioning one surface (for example, the first suction surface) of the side portion of the case 110. Accordingly, the first case 110a may rotate using a bending line (C in FIG. 2) as a rotational axis, and thus the accommodation space 113 provided in the case 110 may be opened.

To this end, the first suction portion 10a may include a first suction member 11a, a first lifting driving apparatus 13, and a rotary plate member 15.

The first suction member 11a may suction the first suction surface of the first case 110a.

The suction of the case 110 may be performed through a vacuum suction method. To this end, a plurality of suction holes may be provided in a portion in which the first suction member 11a opposes the case 110. In addition, for stable suction, the first suction member 11a may be disposed to oppose the entire first suction surface to suction the entire first suction surface. However, the disclosed technology is not limited thereto, and various modifications may be made, such as the first suction member 11a configured to suction only a portion of the first suction surface.

The first suction member 11a may be connected to the first lift drive device 13, and may be configured to be linearly movable by a predetermined distance in the first direction (Z-direction) by the first lift drive device 13. For example, before the case 110 is supplied, the first suction member 11a may rise to form a space in which the case 110 is to be disposed. When the case 110 is supplied, the first suction member 11a may fall to suction the first suction surface of the case 110.

The first lifting driving apparatus 13 may be fixedly coupled to the rotary plate member 15 to be described below. Accordingly, the first suction member 11a may be configured to rise or fall with respect to the rotary plate member 15.

The first lifting driving apparatus 13 may include a hydraulic/pneumatic cylinder for driving of lifting, but the disclosed technology is not limited thereto. The first lifting driving apparatus 13 may be configured in the form of, for example, a linear motor or the like.

The second suction portion 10b may suction the other surface (for example, the second suction surface) of the side portion of the case 110. To this end, the second suction portion 10b may include a second suction member 11b and a second lifting driving apparatus 14.

The second suction member 11b may be disposed to oppose the first suction member 11a, and the case 110 may be disposed between the second suction member 11b and the first suction member 11a. Accordingly, when the first suction member 11a suctions the first suction surface of the case 110, the second suction member 11b may suction the second suction surface of the case 110 at the same time.

The second suction member 11b may be connected to the second lifting driving apparatus 14, and may be configured to be linearly movable by a predetermined distance in the first direction. For example, before the case 110 is supplied, the second suction member 11b may fall to form a space in which the case 110 is to be disposed. When the case 110 is supplied, the second suction member 11b may rise to suction the second suction surface of the case 110.

The second suction member 11b may also suction the case 110 through a vacuum suction method. Accordingly, a plurality of suction holes may be provided in a portion in which the second suction member 11b opposes the case 110. In addition, for stable suction, the second suction member 11b may be disposed to oppose the entire second suction surface to suction the entire second suction surface. However, the disclosed technology is not limited thereto, and various modifications may be made, such as the second suction member 11b configured to suction only a portion of the second suction surface.

As the second suction member 11b suctions the second case 110b, the movement of the second case 110b may be fixed by the second suction portion 10b while the first suction portion 10a rotates, thereby preventing the entire case 110 from shaking or a position of the case 110 from being changed while the first case 110a rotates.

The second lifting driving apparatus 14 may be fixedly fastened to the base frame 50 to control lifting of the second suction member 11*b*. Accordingly, the second suction member 11*b* may be configured to rise or fall with respect to the base frame 50.

The second lifting driving apparatus 14 may include a hydraulic/pneumatic cylinder for driving of lifting, but the disclosed technology is not limited thereto. The second lifting driving apparatus 14 may be configured in the form of a linear motor or the like.

As described above, in the present embodiment, the first suction portion 10*a* may be connected to the base frame 50 through the rotary plate member 15. Specifically, the first lifting driving apparatus 13 may be fixedly fastened to one surface of the rotary plate member 15, and the rotary plate member 15 may be rotatably connected to the base frame 50. Accordingly, when the rotary plate member 15 rotates, the first suction portion 10*a*, connected to the first lifting driving apparatus 13, may also rotate together with the rotary plate member 15.

The rotary plate member 15 may rotate at a predetermined angle by rotational force received from the rotation driving portion 30.

A body of the rotation driving portion 30 may be fixedly fastened to the base frame 50, and the rotary plate member 15 may be coupled to a rotational shaft (not illustrated) of the rotation driving portion 30.

The rotational shaft may be disposed along a rotational axis (D in FIG. 3) of the rotary driving unit 30 to be coupled to the rotary plate member 15. Accordingly, the rotary plate member 15, coupled to the rotational shaft, may rotate by rotation driving of the rotation driving portion 30, and the rotary plate member 15 and the first suction portion 10*a*, fastened to the rotary plate member 15, may rotate with respect to the base frame 50.

In order to rotate the rotational shaft of the rotation driving portion 30, the rotation driving portion 30 may include a rotary apparatus such as a motor, but the disclosed technology is not limited thereto.

The position display portion 70 may be provided to determine whether the case 110 is warped. Specifically, the position display portion 70 may be provided to verify whether the rotational axis D of the rotary plate member 15 and the rotational axis (that is, the bending line C) of the case 110 are disposed on a straight line.

To this end, the position display portion 70 may include at least one laser irradiation unit. For example, the position display portion 70 may irradiate a laser along the rotational axis D of the rotary plate member 15. Accordingly, an operator may directly compare a rotational axis C of the case 110 and the irradiated laser to verify whether the rotational axis of the rotary plate member 15 and the rotational shaft of the case 110 are warped.

In addition, the case opening apparatus 1 according to the present embodiment may include a detection protrusion 16 and a detection unit 17 to detect a degree of rotation of the rotary plate member 15.

The detection protrusion 16 may be in the form of a protrusion protruding outward from the rotary plate member 15. In addition, the detection unit 17 may detect a position of the detection protrusion 16 rotating together with the rotary plate member 15.

The detection unit 17 may be fixedly fastened onto the base frame 50 to detect the degree of rotation of the rotary plate member 15. For example, the detection unit 17 may detect a first position (pre-rotation position) and a second position (maximum rotation position) of the rotary plate member 15. To this end, the detection unit 17 may include a first detection unit detecting the detection protrusion 16 in the first position of the rotary plate member 15, and a second detection unit detecting the detection protrusion 16 in the second position of the rotary plate member 15.

Accordingly, the detection protrusion 16 may be movable only in a range between the first detection unit and the second detection unit, and the rotary plate member 15 may rotate within a range in which the detection protrusion 16 is movable.

The disclosed technology is not limited thereto, and only one detection unit 17 may be disposed, and a plurality of detection protrusions 16 may be disposed. In this case, the detection protrusion 16 may include a first detection protrusion detected by the detection unit in the first position of the rotary plate member 15 and a second detection protrusion detected by the detection unit in the second position of the rotary plate member 15.

The first position of the rotary plate member 15 described above may be a position in which a suction surface of the first suction member 11*a* is disposed to oppose a suction surface of the second suction member 11*b*, and the second position of the rotary plate member 15 may be a position in which the first suction member 11*a* maximally rotates. The first suction member 11*a* may rotate in a state of suctioning the first case 110*a*, such that the first suction member 11*a* may rotate by 180° or less. For example, the first suction member 11*a* may rotate within a range of 60° to 90°.

A photosensor having a light emitting element and a light receiving element may be used as the detection unit 17. In this case, when the detection protrusion 16 is positioned between the light emitting element and the light receiving element, the detection protrusion 16 may be detected.

The detection units 17 may be movably coupled to the base frame 50. To this end, a rail groove may be provided in the base frame 50, and the detection units 17 may be coupled to the rail groove, and positions of the detection units 17 may be changed along the rail groove. In this case, a rotation range of the rotary plate member 15 may be adjusted by changing the position of the detection units 17. Thus, even when a size or condition of the supplied case 110 is changed, such a change may be easily responded.

Subsequently, an operation process of the battery cell case opening apparatus 1 will be described with reference to FIGS. 7 to 9 together.

Figure 7:
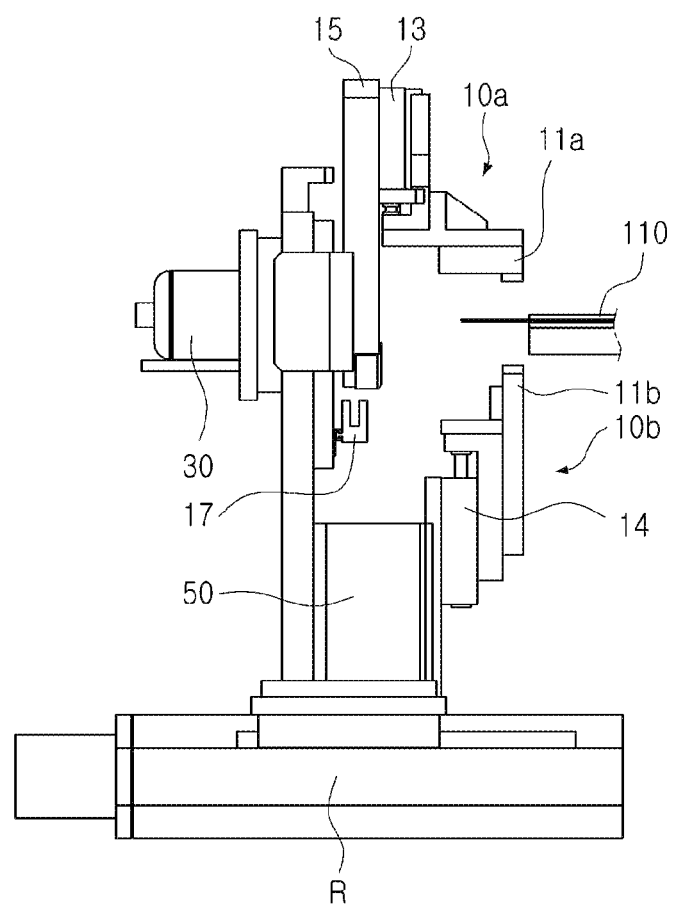
FIGS. 7 and 8 are views of a case opening apparatus in direction "B" of FIG. 4.
Figure 8:
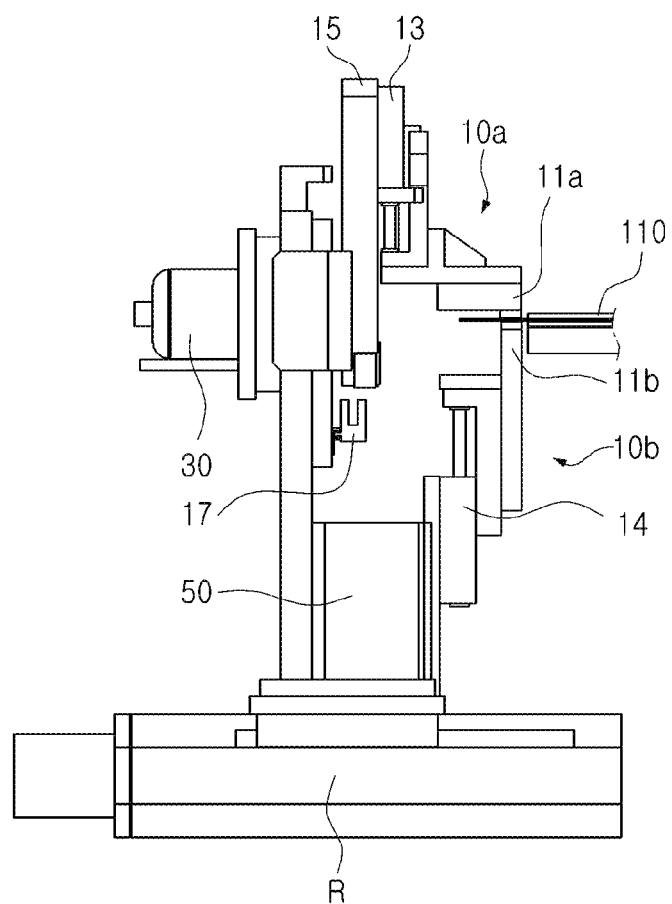

FIGS. 7 and 8 are views of a case opening apparatus in direction "B" of FIG. 4. FIG. 9 is a partially enlarged view of the case opening apparatus illustrated in FIG. 5. Here, FIG. 9 illustrate a state in which a case is open.

First, as illustrated in FIG. 3, the battery cell case 110 may be fixed to the transfer carrier 6 in a folded state along the bend line C, and the transfer carrier 6 may move along the transfer rail 5 toward the case opening apparatus 1 according to the present embodiment.

In this case, as illustrated in FIG. 7, the first suction member 11*a* may stand by in a raised state and the second suction member 11*b* may stand by in a lowered state, and the transfer carrier 6 may allow the case 110 to be positioned between the first suction member 11*a* and the second suction member 11*b*.

Figure 9:
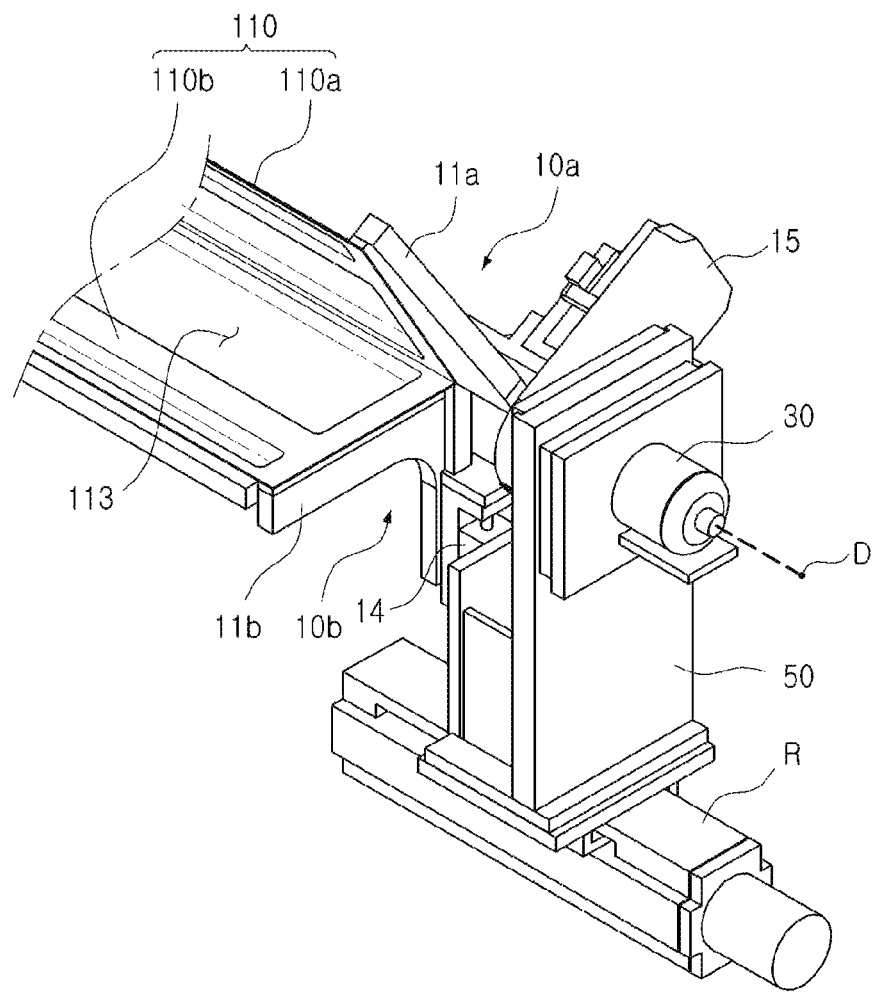
FIG. 9 is a partially enlarged view of the case opening apparatus illustrated in FIG. 5.

Subsequently, as illustrated in FIGS. 4 and 9, the first suction member 11*a* and the second suction member 11*b* move toward the case 110, and may suction the first suction surface and the second suction surface of the case 110, respectively. To this end, the first suction member 11*a* may be lowered by an operation of the first lifting driving apparatus 13, and the second suction member 11b may be raised by the second lifting driving apparatus 14.

In such a process, an operator may verify, through the position indicator 70, whether a folded line of the case 110 is accurately disposed in a position corresponding to that of the rotational axis D of the rotary plate member 15.

Once the position of the case 110 is verified, the rotation driving portion 30 may rotate the rotary plate member 15, as illustrated in FIG. 9. As a result, the first suction portion 10a, coupled to the rotary plate member 15, and the first case 110a, suctioned by the first suction portion 10a, may also rotate together. Accordingly, the case 110 may be opened, such that the accommodation space 113 may be opened. In such a process, the first case 110a may rotate within an angle range of 60° to 90°.

When the accommodation space 113 of the case 110 is opened, a process of inserting an electrode assembly 1 (30 in FIG. 2) into the accommodation space 113 and then rotating the first suction portion 10a in an opposite direction to return the first case 110a to an original position thereof may be performed.

Thereafter, the first suction portion 10a and the second suction portion 10b may be separated from the case 110 by the first and second lifting driving apparatuses 13 and 14, and the transfer carrier 6 may transfer the case 110 to a subsequent process.

The case opening apparatus 1 according to the present embodiment described above may simultaneously suction the first case 110a and the second case 110b, and may then open the case 110, thereby preventing the case 110 from shaking or a position of the case 110 from being changed in a process of opening the case 110.

In addition, the base frame 50 may be configured to be movable in a second direction, and thus may be used to manufacture various battery cells having different sizes.

Only specific examples of implementations of certain embodiments are described. Variations, improvements and enhancements of the disclosed embodiments and other embodiments may be made based on the disclosure of this patent document.

What is claimed is:

1. A case opening apparatus comprising:
    a suction portion including a first suction portion configured to suction an upper portion of a case of a battery cell being in a folded state and a second suction portion configured to suction a lower portion of the case;
    a rotation driving portion configured to open an inside of the case by rotating the first suction portion,
    a rotary plate member having one surface to which the first suction portion is fastened, the rotary plate member rotated by the rotation driving portion; and
    a base frame to which the second suction portion and the rotary plate member are coupled;
    wherein the first suction portion and the second suction portion are configured to move in a first direction, and to suction the upper portion and the lower portion of the case, respectively.

2. The case opening apparatus of claim 1, wherein the base frame is disposed to linearly move in a second direction, orthogonal to the first direction.

3. The case opening apparatus of claim 1, wherein the rotary plate member rotates in a state in which a folded line of the case corresponds to a rotational axis of the rotary plate member.

4. The case opening apparatus of claim 3, further comprising:
    a position display portion configured to display the rotational axis of the rotary plate member.

5. The case opening apparatus of claim 1, further comprising:
    at least one detection unit disposed on the base frame; and
    a detection protrusion formed to protrude outwardly from the rotary plate member, the detection protrusion detected by the detection unit in a maximum rotation position of the rotary plate member.

6. The case opening apparatus of claim 1, further comprising:
    a first lifting driving apparatus configured to move the first suction portion in a first direction,
    wherein the first lifting driving apparatus is fixedly coupled to the rotary plate member.

7. The case opening apparatus of claim 6, further comprising:
    a second lifting driving apparatus configured to move the second suction portion in the first direction,
    wherein the second lifting driving apparatus is fixedly coupled to the base frame.

8. A case opening apparatus comprising:
    a suction portion including a first suction portion configured to suction an upper portion of a case of a battery cell being in a folded state and a second suction portion configured to suction a lower portion of the case; and
    a rotation driving portion configured to open an inside of the case by rotating the first suction portion,
    wherein the suction portion is disposed on each of opposite sides of the case to simultaneously suction opposite edges of the case.

* * * * *